(12) United States Patent
Liang et al.

(10) Patent No.: US 9,131,137 B2
(45) Date of Patent: Sep. 8, 2015

(54) LENS MODULE AND SPEAKER MODULE

(71) Applicant: Wistron Corporation, New Taipei (TW)

(72) Inventors: Jyun-Shuo Liang, New Taipei (TW);
Tsung-Hsien Tsai, New Taipei (TW);
Hung-Li Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 16 days.

(21) Appl. No.: 14/148,727

(22) Filed: Jan. 7, 2014

(65) Prior Publication Data

US 2015/0098003 A1    Apr. 9, 2015

(30) Foreign Application Priority Data

Oct. 8, 2013  (TW) .............................. 102136403 A

(51) Int. Cl.
*H04N 5/225* (2006.01)
*H04N 5/232* (2006.01)
*H04R 1/02* (2006.01)
*G02B 7/02* (2006.01)
*G02B 7/09* (2006.01)
*G03B 13/36* (2006.01)

(52) U.S. Cl.
CPC .............. *H04N 5/2254* (2013.01); *G02B 7/022* (2013.01); *G02B 7/023* (2013.01); *G02B 7/026* (2013.01); *G02B 7/09* (2013.01); *G03B 13/36* (2013.01); *H04N 5/23287* (2013.01); *H04R 1/025* (2013.01); *H04R 1/026* (2013.01)

(58) Field of Classification Search
CPC .............. H04N 5/2253; H04N 5/2254; H04N 5/23287; G02B 7/023; G02B 7/026; G03B 13/36
See application file for complete search history.

(56) References Cited

U.S. PATENT DOCUMENTS

| 2005/0264673 | A1* | 12/2005 | Kuchimaru .................... 348/335 |
| 2006/0098968 | A1* | 5/2006 | Ito et al. ........................... 396/85 |
| 2007/0053672 | A1* | 3/2007 | Westerweck et al. ........... 396/79 |
| 2007/0092235 | A1* | 4/2007 | Misawa ........................... 396/55 |
| 2009/0052037 | A1* | 2/2009 | Wernersson .................... 359/554 |
| 2009/0135260 | A1* | 5/2009 | Rouvinen et al. ........ 348/208.11 |

\* cited by examiner

*Primary Examiner* — Paul Berardesca
(74) *Attorney, Agent, or Firm* — Jianq Chyun IP Office

(57) ABSTRACT

A lens module and a speaker module are provided. The lens module includes a lens stand, a base and a shape memory alloy. The shape memory alloy connects the lens stand and the base. The speaker module includes a speaker unit, a box and a shape memory alloy. The box has a rear wall and an opening. The shape memory alloy connects the speaker unit and the rear wall.

8 Claims, 7 Drawing Sheets

LENS MODULE AND SPEAKER MODULE

CROSS-REFERENCE TO RELATED APPLICATION

This application claims the priority benefit of Taiwan application serial no. 102136403, filed on Oct. 8, 2013. The entirety of the above-mentioned patent application is hereby incorporated by reference herein and made a part of this specification.

BACKGROUND OF THE INVENTION

1. Field of the Invention

The present invention relates to a lens module and a speaker module, and more particularly to a lens module and a speaker module adopting a shape memory alloy.

2. Description of Related Art

With the development of technology, consumers have higher and higher expectations for entertaining functions of electronic products. Nowadays, almost all electronic products require a lens and a speaker so that users may take pictures, have video communication with others, listen to music and view videos, etc. at any time. However, when mounted in an electronic device, current lens modules are not able to rotate or shift left or right without the whole electronic device being turned, not to say adjusting focal distances. On the other hand, when mounted in an electronic device, current speaker modules are not able to adjust the output orientation of sounds without the whole electronic device being turned. Therefore, traditional lens and speaker in electronic devices are considerably limited in use.

SUMMARY OF THE INVENTION

A lens module is provided, capable of solving the problem of limited use of traditional lenses in electronic devices.

A speaker module is provided, capable of solving the problem of limited use of traditional speakers in electronic devices.

The lens module includes a lens stand, a base and a first shape memory alloy. The first shape memory alloy connects the lens stand and the base.

According to an embodiment, the lens module further comprises two screws, both ends of each screw are a stopper end and a thread end, wherein the thread end of the screw is locked to the base, both sides of the lens stand have a through hole respectively, and each screw passes through one of the through holes.

According to an embodiment, the lens module further comprises four resilient sleeves arranged on each screw in pairs, wherein the resilient sleeves on each screw are situated between the stopper end and the lens stand and between the base and the lens stand respectively.

According to an embodiment, the lens module further comprises a second shape memory alloy connecting the lens stand and the base, wherein the screws, the first shape memory alloy and the second shape memory alloy are disposed on the base in a row, and the first shape memory alloy and the second memory alloy are situated between the screws.

According to an embodiment, the base has two screw barrels disposed thereon, and the thread end of each screw is locked into one of the screw barrels.

According to an embodiment, the lens stand has at least one lens and an image sensing element.

According to an embodiment, the lens stand has at least one lens, while the base has an image sensing element.

According to an embodiment, the first shape memory alloy is spring-like or cylindrical.

The speaker module includes a speaker unit, a box and a first shape memory alloy. The box has a rear wall and an opening. The first shape memory alloy connects the speaker unit and the rear wall.

According to an embodiment, the speaker module further comprises two screws, both ends of each screw are a stopper end and a thread end, wherein the thread end of the screw is locked to the rear wall, both sides of the speaker unit have a through hole respectively, and each screw passes through one of the through holes.

According to an embodiment, the speaker module further comprises four resilient sleeves arranged on each screw in pairs, wherein the resilient sleeves on each screw are situated between the stopper end and the speaker unit and between the rear wall and the speaker unit respectively.

According to an embodiment, the speaker module further comprises a second shape memory alloy connecting the speaker unit and the rear wall, wherein the screws, the first shape memory alloy and the second shape memory alloy are disposed on the rear wall in a row, and the first shape memory alloy and the second memory alloy are situated between the screws.

According to an embodiment, the rear wall has two screw barrels disposed thereon, and the thread end of each screw is locked into one of the screw barrels.

According to an embodiment, the box further has an annular sidewall connecting between the rear wall and the opening, wherein the annular sidewall has telescopic creases.

According to an embodiment, the first shape memory alloy is spring-like or cylindrical.

According to an embodiment, the box further has an annular sidewall connecting between the rear wall and the opening, wherein the annular sidewall has telescopic creases.

Based on the above, in the lens module, relative positions of the lens stand and the base are changed by simply adjusting the size of the shape memory alloy. In the speaker module, relative positions of the speaker unit and the rear wall are changed by simply adjusting the size of the shape memory alloy. Thereby, convenience in using the lens module and the speaker module mounted in the electronic device is enhanced.

To make the above features and advantages of the present invention more comprehensible, several embodiments accompanied with drawings are described in detail as follows.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DESCRIPTION OF EMBODIMENTS

A lens module and a speaker module are provided. Although belonging to different genres of products, both use a shape memory alloy to connect to two elements between which distance needs to be adjusted, for example, connecting a lens stand and a base, or connecting a speaker unit and a rear wall. Similarly, based on the characteristic that the size of the shape memory alloy varies with temperature, the distance between the two elements connected by the shape memory alloy becomes adjustable. Therefore, after the lens module and the speaker module are assembled in an electronic device, relative positions between the lens stand and the speaker unit in the electronic device can still be adjusted, so as to achieve focusing lens and adjusting the output direction of sounds.

Figure 1:
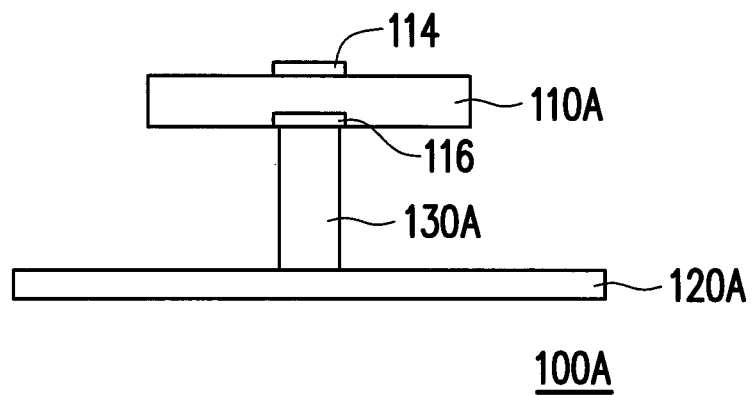
FIG. 1 is a schematic view of a lens module according to one embodiment.

FIG. 1 is a schematic view of a lens module according to one embodiment. Referring to FIG. 1, a lens module 100A of the present embodiment includes a lens stand 110A, a base 120A and a first shape memory alloy 130A. The first shape memory alloy 130A connects the lens stand 110A and the base 120A. The first shape memory alloy 130A is made of shape memory alloy. The shape memory alloy is formed by depositing more than two different metal atoms. Since the size and structure of the metal atoms differ, conditions for forming the alloy differ. Thereby, different crystalline structures are formed, including an "austenite structure" and a "martensite structure," while the transition between the two structures is called "austenite phase change." The shape memory alloy has "martensite phase change," and the alloy transforms from the "martensite structure" to the "austenite structure" and restores to the original shape when heated to the phase change temperature. Therefore, upon being supplied with power, the temperature of the first shape memory alloy 130A rises and reaches a stable temperature after a certain period of time. At this moment, the length of the first shape memory alloy 130A also differs from the length prior to power supply. Thereby, the purpose of adjusting the distance between the lens stand 110A and the base 120A is achieved. With the difference in the current applied to the first shape memory alloy 130A, the stable temperature finally achieved by the first shape memory alloy 130A differs. Therefore, adjusting the current applied to the first shape memory alloy 130A adjusts the length of the first shape memory alloy 130A.

When the lens module 100A is assembled in the electronic device (not shown), the lens module 100A is secured on a shell of the electronic device via the base 120A. When the temperature of the first shape memory alloy 130A is changed, even if the relative distance between the electronic device and the object to be focused on does not change, the relative distance between the lens stand 110A and the object to be focused on can still be changed, thereby achieving the purpose such as focusing.

Figure 2:
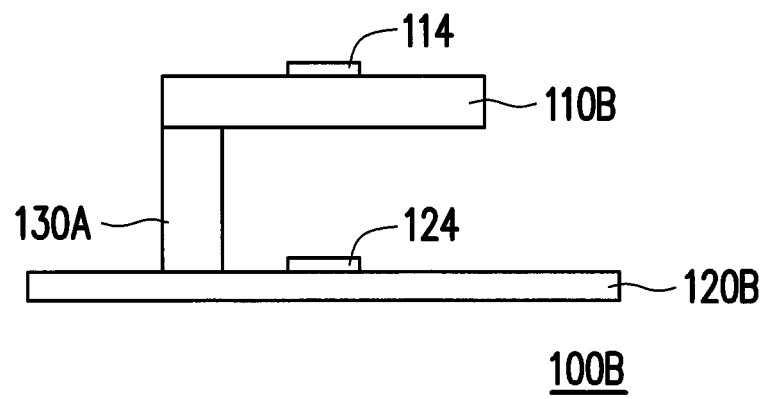
FIG. 2 is a schematic view of a lens module according to another embodiment.

The present embodiment takes the example that the first memory shape memory alloy 130A has a cylindrical profile, and also that the lens module has only one first shape memory alloy 130A, but the invention is not limited thereto. The lens stand 110A of the present embodiment has, for example, at least one lens 114 and an image sensing element 116. In other words, a constant relative position is kept between the lens 114 and the image sensing element 116 of the present embodiment. However, in a lens module 100B of FIG. 2, the lens stand 110B merely has at least one lens 114, while the base 120B has an image sensing element 124. That is, when the length of the first shape memory alloy 130A is changed, the distance between the lens 114 and the image sensing element 124 also changes.

Figure 3:
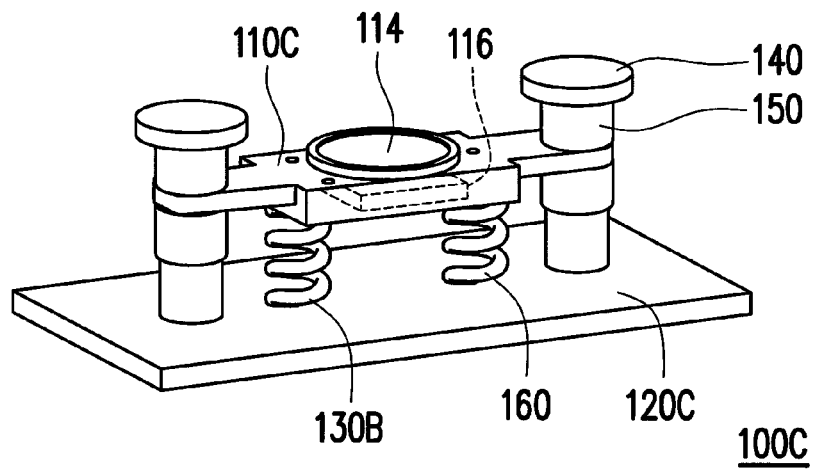
FIG. 3 is a schematic view of a lens module according to yet another embodiment.
Figure 4:
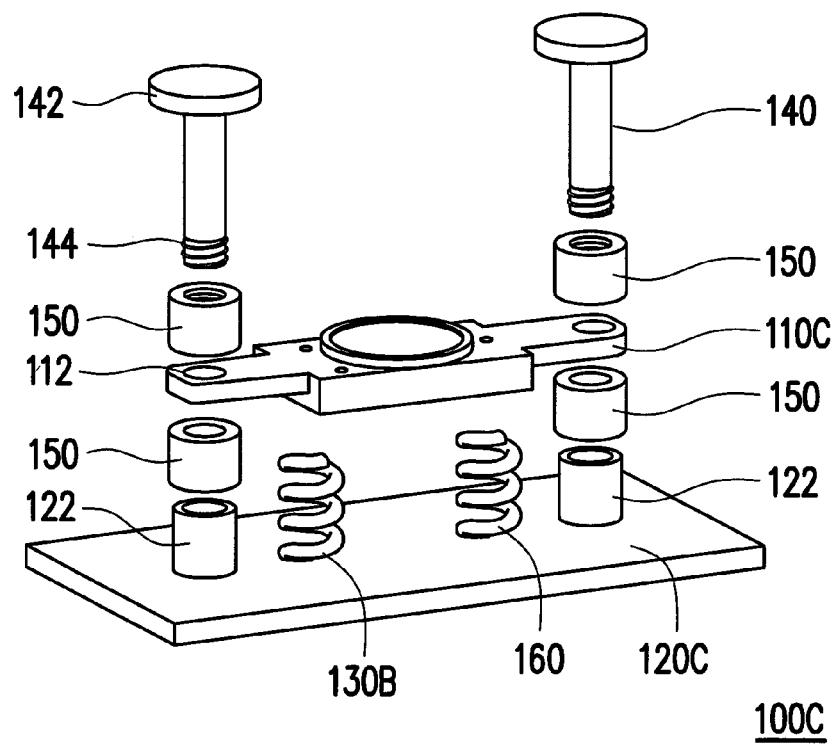
FIG. 4 is an exploded view of the lens module in FIG. 3.

FIG. 3 is a schematic view of a lens module according to yet another embodiment, while FIG. 4 is an exploded view of the lens module in FIG. 3. Referring to FIGS. 3 and 4, a lens module 100C of the present embodiment is similar to the lens module 100A of FIG. 1, and merely the differences are elaborated herein. The lens module 100C of the present embodiment further includes two screws 140. Both ends of each screw 140 are a stopper end 142 and a thread end 144. The thread end 144 of the screw 140 is locked to a base 120C. Both sides of a lens stand 110C have a through hole 112 respectively. Each screw 140 passes through one through hole 112. By means of the arrangement of the screw 140, the lens stand 110C is able to slide between the stopper end 142 of the screw 140 and the base 120C.

In the present embodiment, the lens module may further include four resilient sleeves 150. Two resilient sleeves 150 are arranged on each screw 140. One resilient sleeve 150 on each screw 140 is situated between the stopper end 142 and the lens stand 110C, while the other resilient sleeve 150 is situated between the base 120C and the lens stand 110C. The resilient sleeves 150 are able to serve as buffers between the stopper end 142 and the lens stand 110C and between the base 120C and the lens stand 110C.

In the present embodiment, the lens module 100C includes a first shape memory alloy 130B and a second shape memory alloy 160, both connecting the lens stand 110C and the base 120C. The present embodiment takes the example that the first shape memory alloy 130B and the second shape memory alloy 160 are spring-like. The screw 140, the first shape memory alloy 130B and the second shape memory alloy 160 are disposed on the base 120C in a row, and the first shape memory alloy 130B and the second shape memory alloy 160 are situated between the two screws 140. The base 120C of the present embodiment, for example, has two screw barrels 122. The thread end 144 of each screw 140 is locked into one screw barrel 122.

Figure 5:
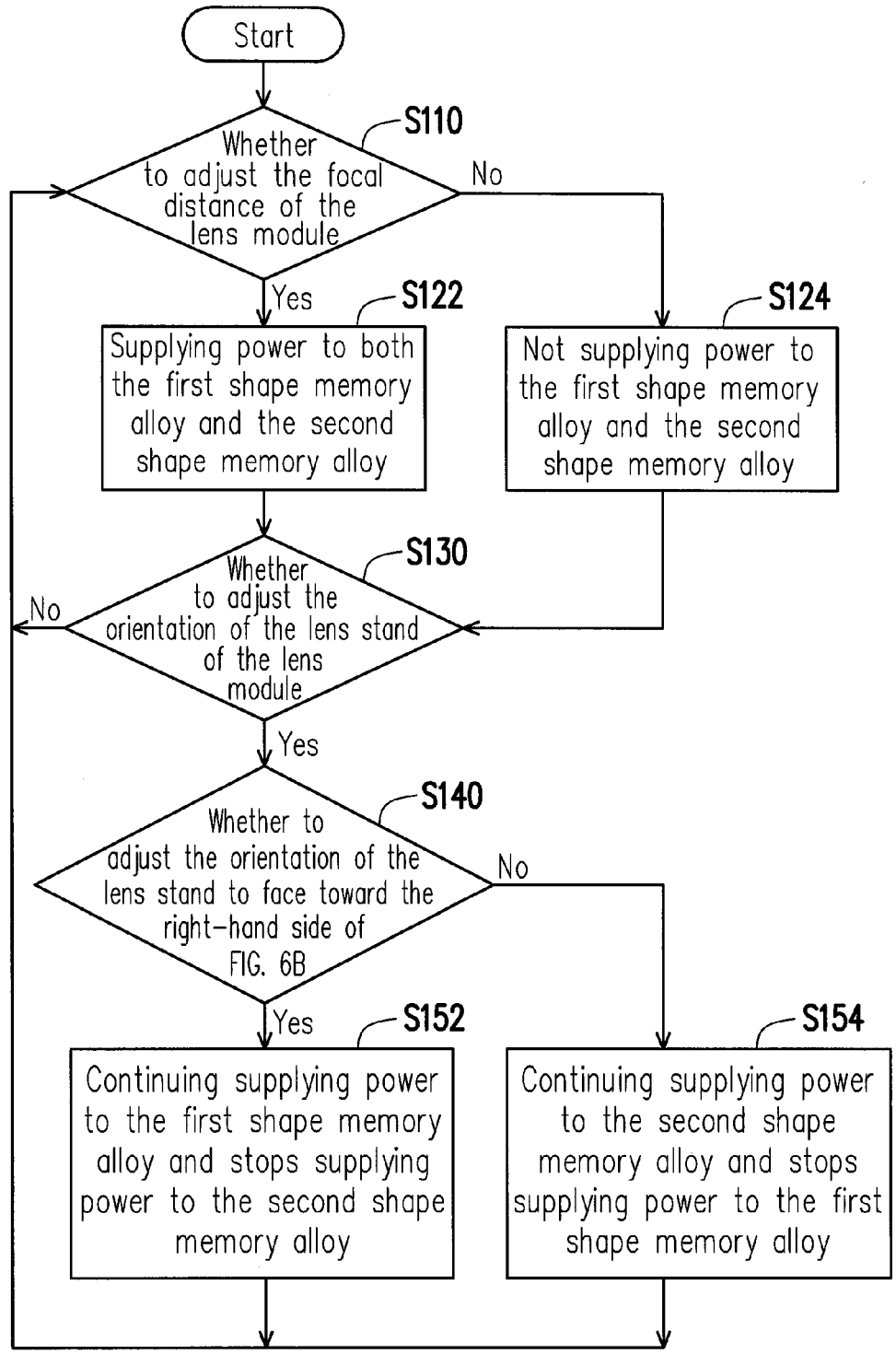
FIG. 5 is a flowchart of an actuating example of the lens module.
Figure 6A:
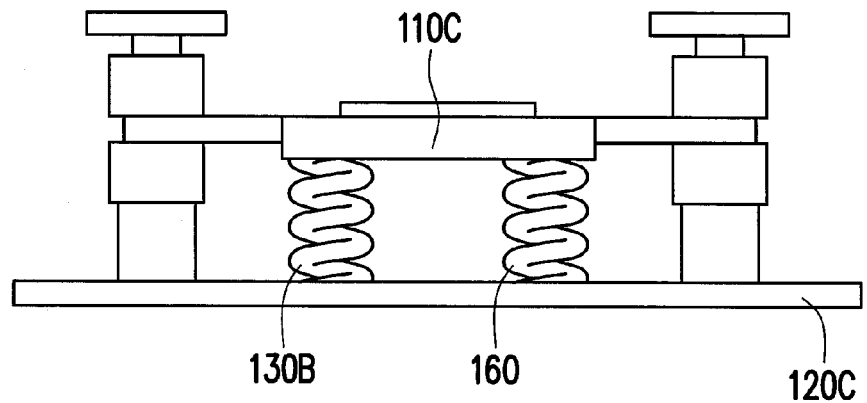
FIGS. 6A to 6D are schematic views of four states of the lens module.
Figure 6B:
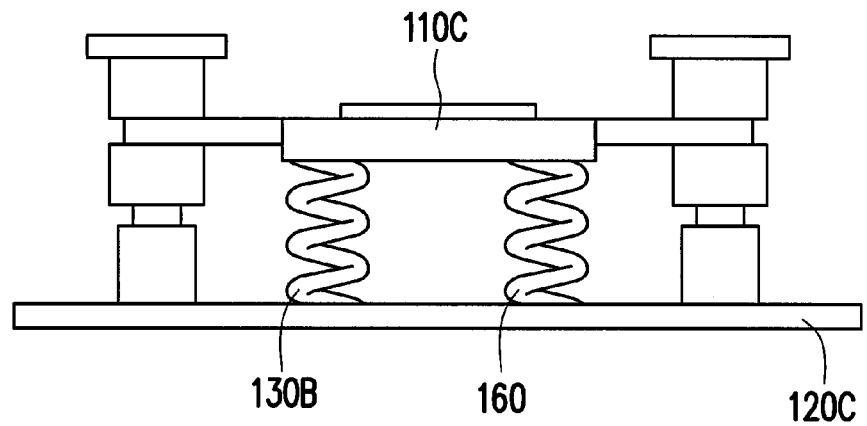
Figure 6C:
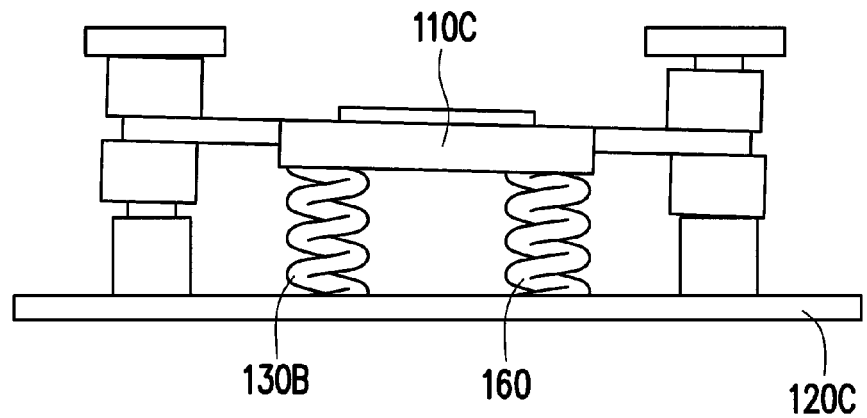
Figure 6D:
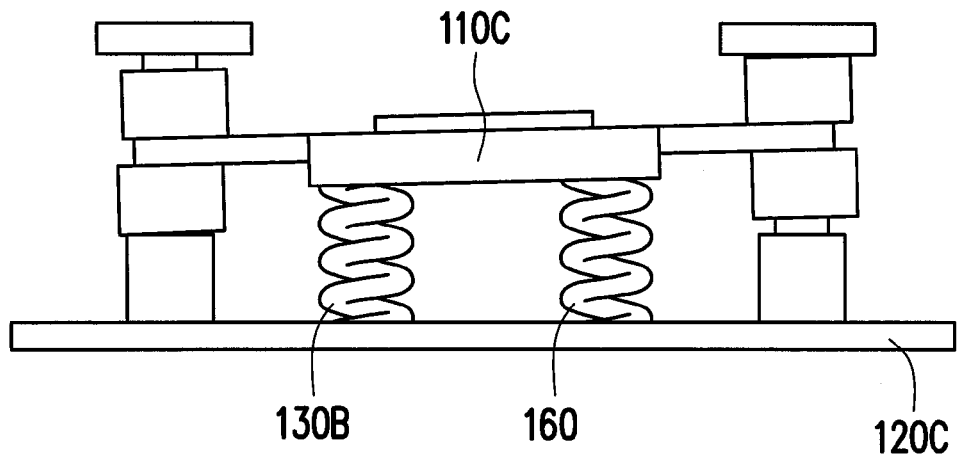

Next, we take the lens module 100C for example to describe the actuating manner of the lens module. FIG. 5 is a flowchart of an actuating example of the lens module, while FIGS. 6A to 6D are schematic views of four states of the lens module. Referring to FIG. 5, after the actuating process of the lens module starts, the user first decides whether to adjust the focal distance of the lens module, which is a step S110. If yes, a step S122 is entered, wherein power is supplied to both the first shape memory alloy 130B and the second shape memory alloy 160 to change the temperatures of the first shape memory alloy 130B and the second shape memory alloy 160 simultaneously and thereby change the lengths of both, for example, changing from the state in FIG. 6A to the state in FIG. 6B. If not, a step S124 is entered, wherein power is not supplied to the first shape memory alloy 130B and the second shape memory alloy 160, for example, maintaining the state in FIG. 6A.

After the steps S122 and S124, the user further decides whether to adjust the orientation of the lens stand of the lens module, which is a step S130. If not, the process returns to the step S110. If yes, a step S140 is entered, wherein, for example, the user decides whether to adjust the orientation of the lens stand to face toward the right-hand side of FIG. 6B. If yes, a step S152 is entered, wherein power continues to be supplied to the first shape memory alloy 130B and stops to be supplied to the second shape memory alloy 160. Thereby, the lens module changes from the state in FIG. 6B into the state in FIG. 6C, i.e. adjusting the orientation of the lens stand 110C to face toward the right-hand side in FIG. 6C. If not, a step S154 is entered, wherein power continues to be supplied to the second shape memory alloy 160 and stops to be supplied to the first shape memory alloy 130B. Thereby, the lens module changes from the state in FIG. 6B into the state in FIG. 6D, i.e. adjusting the orientation of the lens stand 110C to face toward the left-hand side in FIG. 6D. After the steps S152 or S154, the process may return to the step S110. It should be noted that although FIG. 5 takes the example that the user first decides whether to adjust the focal distance of the lens module, in other embodiments, the user may also first decide whether to adjust the orientation of the lens stand, or the user may complete at once provision of his commands about adjusting the focal distance and the orientation before the lens module actuates.

In the lens module 100C of FIG. 3, example is taken by having two shape memory alloys to achieve the possibility that the lens stand 110C has translational motion in one orientation and to obtain a degree of freedom of the rotating motion of the lens stand 110C. However, in other embodiments, the degree of freedom of motions of the lens stand 110C may certainly be increased by adding the number of the shape memory alloys, by changing the manner of connecting the shape memory alloys with the lens stand 110C and the base 120C, or by other manners.

Figure 7:
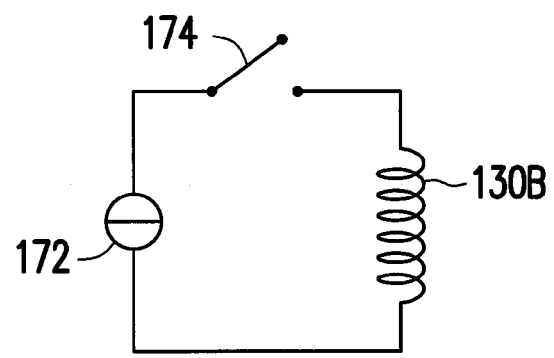
FIG. 7 is a circuit diagram that shows a connection by a first shape memory alloy in FIG. 3.

FIG. 7 is a circuit diagram that shows a connection by a first shape memory alloy in FIG. 3. Referring to FIG. 7, the first shape memory alloy 130B forms a loop with, for example, a current source 172 and a switch 174. When the switch 174 is turned on, the current source 172 provides current to the first shape memory alloy 130B to raise the temperature thereof, so that the size of the first shape memory alloy 130B is changed. When the switch 174 is turned off, the current source 172 could not provide current to the first shape memory alloy 130B, and the temperature of the first shape memory alloy 130B lowers down, so that the size of the first shape memory alloy 130B is changed.

Figure 8A:
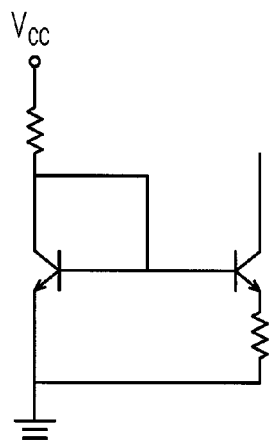
FIGS. 8A-8C are circuit diagrams of three embodiments of the current source in FIG. 7.
Figure 8B:
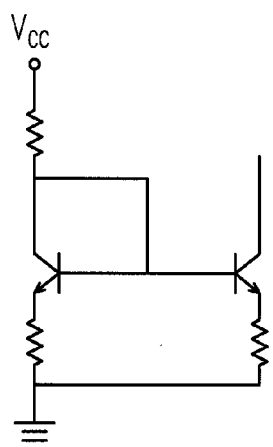
Figure 8C:
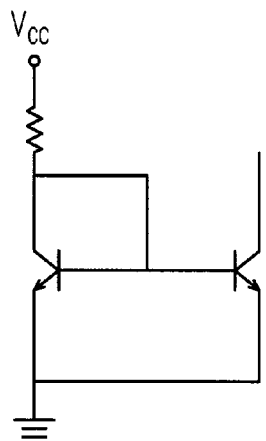

FIGS. 8A-8C are circuit diagrams of three embodiments of the current source in FIG. 7. The current source 172 in FIG. 7 may adopt a variety of designs, such as a micro-current source in FIG. 8A, a proportional current source in FIG. 8B or a current mirror in FIG. 8C.

Figure 9:
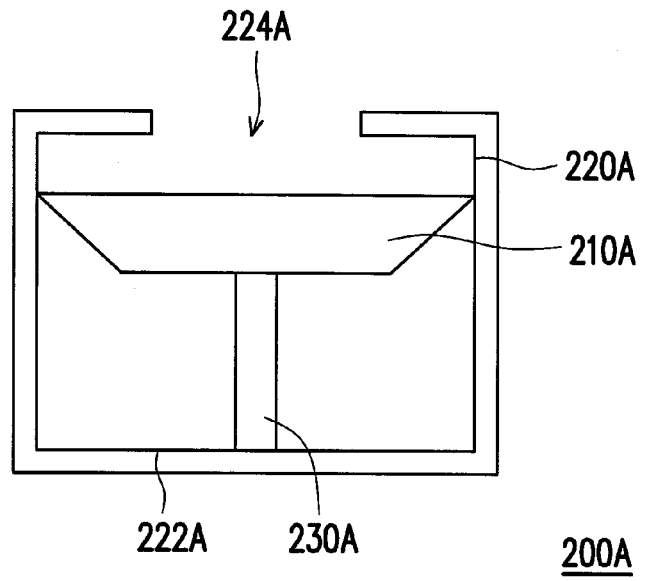
FIG. 9 is a schematic view of a speaker module according to an embodiment.

FIG. 9 is a schematic view of a speaker module according to an embodiment. Referring to FIG. 9, the speaker module 200A of the present embodiment includes a speaker unit 210A, a box 220A and a first shape memory alloy 230A. The box 220A has a rear wall 222A and an opening 224A. The first shape memory alloy 230A connects the speaker unit 210A and the rear wall 222A. Upon being supplied with power, the temperature of the first shape memory alloy 230A rises and reaches a stable temperature after a certain period of time. At this moment, the length of the first shape memory alloy 230A also differs from the length prior to power supply. Thereby, the distance between the speaker unit 210A and the rear wall 222A is adjusted, and thereby the volume of the resonant cavity between the speaker unit 210A and the rear wall 222A is adjusted to achieve the purpose of adjusting tone quality. With the difference in the current applied to the first shape memory alloy 230A, the stable temperature finally achieved by the first shape memory alloy 230A differs. Therefore, adjusting the current applied to the first shape memory alloy 230A adjusts the length of the first shape memory alloy 230A. The first memory shape memory alloy 230A of the present embodiment takes a cylindrical profile for example, and the present embodiment takes having only one first shape memory alloy 230A for example, but the invention is not limited thereto.

Figure 10:
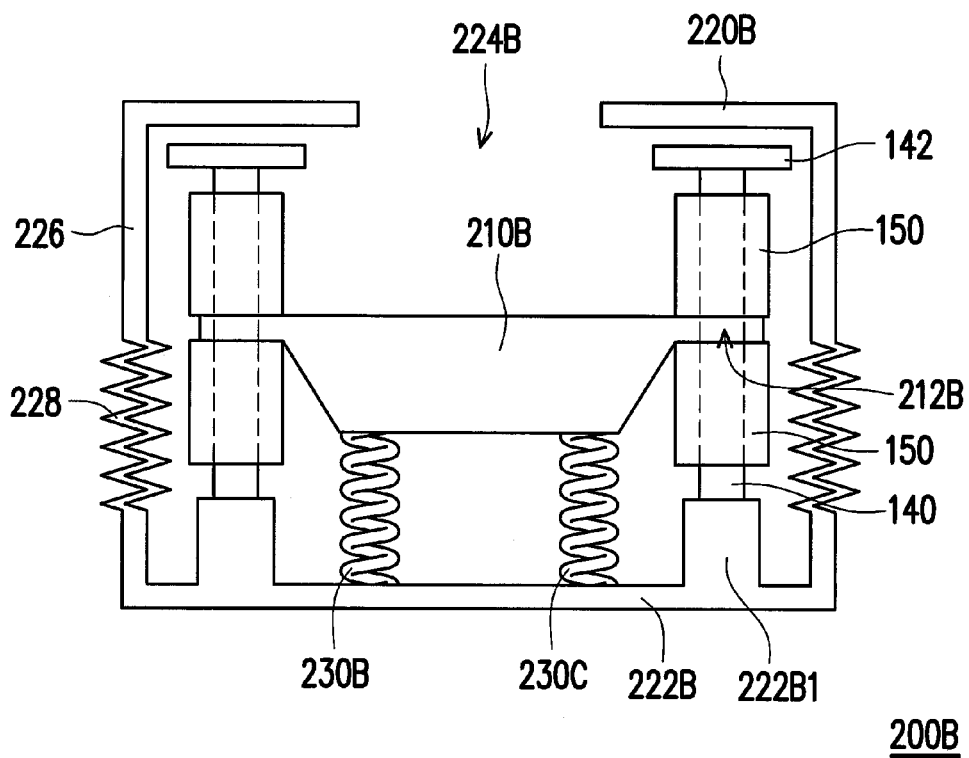
FIG. 10 is a schematic view of a speaker module according to another embodiment.

FIG. 10 is a schematic view of a speaker module according to another embodiment. Referring to FIG. 10, the lens module 200B of the present embodiment is similar to the speaker module 200A of FIG. 9, and merely the differences are elaborated herein. Therein, part of the elements are similar to the elements of the lens module of FIG. 4. Please refer thereto to understand relevant details. The speaker module 200B of the present embodiment further includes two screws 140. Both ends of each screw 140 are a stopper end 142 and a thread end 144. The thread end 144 of the screw 140 (referring to FIG. 4) is locked to a rear wall 222B, and both sides of a speaker unit 210B have one through hole 212B respectively. Each screw 140 passes through one through hole 212B. By means of the arrangement of the screw 140, the speaker unit 210B is able to slide between the stopper end 142 of the screw 140 and the rear wall 222B.

In the present embodiment, the speaker module 200B further includes four resilient sleeves 150. Two resilient sleeves 150 are arranged on each screw 140. One resilient sleeve 150 on each screw 140 is situated between the stopper end 142 and the speaker unit 210B, while the other resilient sleeve 150 is situated between the rear wall 222B and the speaker unit 210B.

In the present embodiment, the speaker module 200B includes a first shape memory alloy 230B and a second shape memory alloy 230C, both connecting the speaker unit 210B and the rear wall 222B. The present embodiment takes the example that the first shape memory alloy 230B and the second shape memory alloy 230C are spring-like. The screw 140, the first shape memory alloy 230B and the second shape memory alloy 230C are disposed on the rear wall 222B in a row, and the first shape memory alloy 230B and the second shape memory alloy 230C are situated between the two screws 140. In the present embodiment, the rear wall 222B has two screw barrels 222B1 disposed thereon, and the thread end 144 (referring to FIG. 4) of each screw 140 is locked into one screw barrel 222B1.

A box 220B of the present embodiment further has an annular sidewall 226 connected between the rear wall 222B and the opening 224B, and the annular sidewall 226 has telescopic creases 228. By means of the telescopic creases 228, when the sizes of the first shape memory alloy 230B and the second shape memory alloy 230C changes, the volume of the resonant cavity between the speaker unit 210A and the rear wall 222A has a larger possibility of variation. In addition, the manner of actuation as illustrated in FIG. 5 may also be applied to the speaker module 200B of the present embodiment, that is, the orientation of the speaker unit 210A of the speaker module 200B may similarly be adjusted by using the first shape memory alloy 230B and the second shape memory alloy 230C, so as to change the output direction of sounds.

Based on the above, in the lens module, the shape memory alloy connects the lens stand and the base, and therefore relative positions of the lens stand and the base are changed by simply adjusting the size of the shape memory alloy. In the speaker module, the shape memory alloy connects the speaker unit and the rear wall, and therefore relative positions of the speaker unit and the rear wall are changed by simply adjusting the size of the shape memory alloy. Thereby, operations such as focusing, rotating, adjusting the volume of the resonant cavity may be performed on the lens module and the speaker module mounted in the electronic device, which increases the convenience in use.

Although the invention has been described with reference to the above embodiments, it will be apparent to one of ordinary skill in the art that modifications to the described embodiments may be made without departing from the spirit and scope of the invention. Accordingly, the scope of the invention will be defined by the attached claims and not by the above detailed descriptions.

What is claimed is:

1. A lens module, comprising:
   a lens stand;
   a base;
   a first shape memory alloy connecting the lens stand and the base;
   two screws, one end of each of the screws being a stopper end and the other end of each of the screws being a thread end, wherein the thread ends of the screws are locked to the base, both sides of the lens stand have a through hole respectively, and each of the screws passes through one of the through holes; and
   four resilient sleeves arranged on the screws in pairs, wherein the resilient sleeves on each of the screws are respectively situated between the stopper end and the lens stand and between the base and the lens stand.

2. The lens module according to claim 1, further comprising a second shape memory alloy connecting the lens stand and the base, wherein the screws, the first shape memory alloy and the second shape memory alloy are disposed on the base in a row, and the first shape memory alloy and the second memory alloy are situated between the screws.

3. The lens module according to claim 2, wherein the base has two screw barrels disposed thereon, and the thread end of each of the screws is locked into one of the screw barrels.

4. The lens module of claim 1, wherein the lens stand has at least one lens and an image sensing element.

5. The lens module of claim 1, wherein the lens stand has at least one lens, while the base has an image sensing element.

6. The lens module of claim 1, wherein the lens stand has at least one lens and an image sensing element.

7. The lens module of claim 1, wherein the lens stand has at least one lens, while the base has an image sensing element.

8. The lens module according to claim 1, wherein the first shape memory alloy is spring-like or cylindrical.

\* \* \* \* \*